US006951314B2

(12) United States Patent
Tang

(10) Patent No.: US 6,951,314 B2
(45) Date of Patent: Oct. 4, 2005

(54) CONDIMENT DISPENSER

(75) Inventor: Wing Sum Tang, Kowloon (HK)

(73) Assignee: Samson Bright Industrial Co. Ltd., Hong Kong (HK)

( * ) Notice: Subject to any disclaimer, the term of this patent is extended or adjusted under 35 U.S.C. 154(b) by 144 days.

(21) Appl. No.: 10/338,581

(22) Filed: Jan. 8, 2003

(65) Prior Publication Data

US 2004/0129812 A1 Jul. 8, 2004

(51) Int. Cl.⁷ .......................... A01D 34/90; A47J 42/00
(52) U.S. Cl. ................. 241/169.1; 241/168; 241/169
(58) Field of Search .................. 241/169, 169.1; 403/326, 327, 329; 188/82.7; 192/41 R, 46

(56) References Cited

U.S. PATENT DOCUMENTS

| | | | |
|---|---|---|---|
| 1,761,344 A | * | 6/1930 | Huber .................... 439/256 |
| 2,774,385 A | * | 12/1956 | Rabaseda ................. 192/46 |
| 4,822,228 A | | 4/1989 | Senft et al. |
| 5,634,733 A | | 6/1997 | Sperduti |

FOREIGN PATENT DOCUMENTS

| | | |
|---|---|---|
| EP | 0830990 | 3/1998 |
| GB | 2217231 | 4/1988 |

* cited by examiner

Primary Examiner—Derris H. Banks
Assistant Examiner—Jason Y Pahng
(74) Attorney, Agent, or Firm—Robert D. Katz; Cooper & Dunham LLP

(57) ABSTRACT

The invention provides a generally cylindrical, releasable interlocking arrangement comprising a lower portion having an inwardly-directed rim at its upper end, and an upper portion having outwardly-directed resilient members at an outer periphery thereof. The two portions snap-fit into one another and are mutually rotatable. The second portion consists of a flexible ring-shaped element with the resilient members extending longitudinally and radially thereof, an outer element that receives the resilient members in slots in the outer periphery thereof, and a third element that engages with the outer element and retains the resilient members in the slots. The two portions of the interlocking arrangement may be secured within respective cylindrical housing parts of a grinding device, in particular a pepper mill, with a drive member of a grinding mechanism passing freely through the lower portion and engaging with the upper portion of the arrangement.

7 Claims, 2 Drawing Sheets

FIG. 6
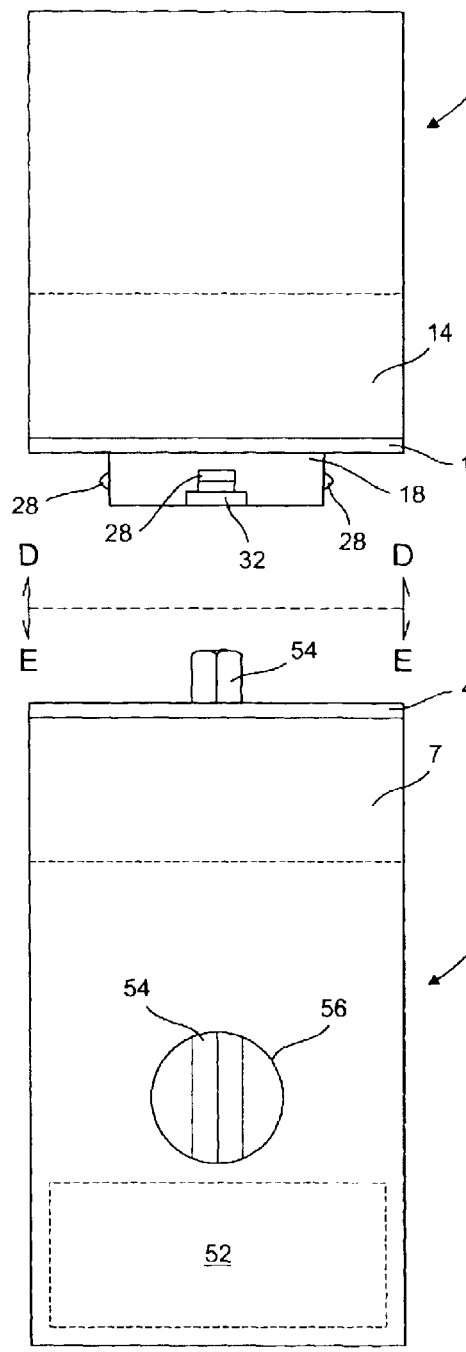
FIG. 7
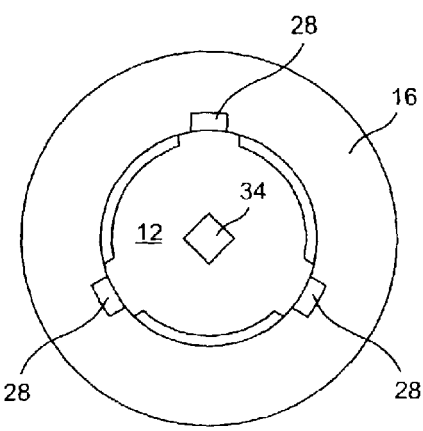
FIG. 8
FIG. 9
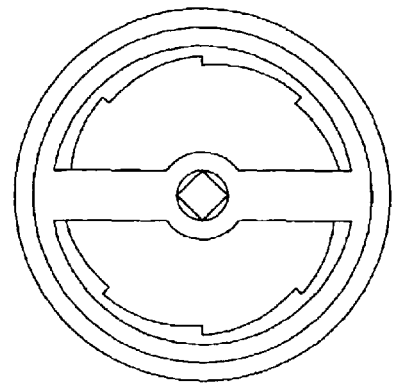

CONDIMENT DISPENSER

FIELD OF THE INVENTION

This invention relates to a condiment dispenser, particularly, though not exclusively, a pepper mill, and to an interlocking arrangement that may be used therein which secures the two parts of the dispenser together.

BACKGROUND OF THE INVENTION

Pepper mills, for example, are known in a generally cylindrical form provided as two compartments that are longitudinally retained together but which may be rotated relatively to each other in order to grind peppercorns that are stored therein so as to dispense the ground pepper therefrom. The two parts of the dispenser have to be releasable to replenish the stock of peppercorns. In one known pepper mill, a generally cylindrical peppercorn container is provided is closed at its bottom end by a grinding mechanism with a drive shaft extending upwardly from the grinding mechanism. A closure cap fits onto the top of the cylindrical container, and the drive shaft, which is screw threaded at its upper end, engages with and passes out through the cap such that a nut can be screwed thereonto so as to secure the cap to the container. While the cap is longitudinally secured to the cylindrical container, relative rotation can take place therebetween which has the effect of rotating the drive shaft to operate the grinding mechanism so as to dispense pepper from the container.

It is an object of the present invention to provide a releasable interlocking arrangement so that two portions thereof can be secured together whilst being relatively portable.

It is another object of the present invention to provide a condiment dispenser, and in particular, a pepper mill or grinder, in which two housing parts thereof, for example, a reservoir and a closure cap, are secured together by such a releasable interlocking arrangement.

SUMMARY OF THE INVENTION

In accordance with one aspect of the present invention, there is provided a releasable interlocking arrangement comprising: a first portion having an inwardly-directed rim; and a second portion having outwardly-directed resilient members retained in respective apertures at an outer periphery thereof; wherein the second portion is arranged to be received within the first portion and to be retained therein by its resilient members snap-fitting into the first portion and engaging behind the rim thereof, and wherein the first and second portions are rotatable with respect to each other when so interlocked.

Advantageously, the interlocking arrangement is of substantially cylindrical configuration, with the first and second portions being arranged on a common longitudinal axis thereof.

The second portion may comprise a flexible, generally ring-shaped element that has interlocking members extending radially, and preferably also longitudinally, therefrom.

The second portion may comprise a second, outer element that receives the ring-shaped element therewithin, with the resilient members engaging in respective slots in the outer periphery of the second element. Advantageously, the second element is of substantially disc-like configuration and the radially extending flexible members of the ring-shaped element may abut the closed ends of the respective ones of the slots. Preferably, there are three resilient members and three co-operating slots, but there may be two, or four or more. Advantageously, the resilient members and slots are equispaced around the periphery of the ring-shaped element and the outer element respectively of the second portion of the interlocking arrangement.

The second portion may comprise a third element that engages within the second element and retains the resilient members of the ring-shaped element longitudinally within the slots.

The second portion of the arrangement, and preferably the second element thereof, may be provided with an aperture, preferably centrally thereof, for receiving a drive member, for example a shaft, for effecting the relative rotation of the first and second portions.

The components of the arrangement are preferably made of a plastics material, and where the second portion comprises a plurality of elements, they may be secured together by means of an adhesive.

In accordance with a further aspect of the present invention, there is provided a device for grinding granular material, preferably a pepper mill, comprising: a first part that comprises a housing for receiving the granular material therein, and a grinding mechanism closing one end of the housing with a drive member thereof extending towards the other end of the housing; a second part that comprises a cap of the device; and a releasable interlocking arrangement according to the said first aspect of the invention, with the first and second portions thereof fixed within the first and second parts of the device respectively, such that when the first and second portions are interlocked, the first and second parts of the device are longitudinally secured together with the drive member of the grinding mechanism engaging the second portion and with the two parts of the device being rotatable with respect to each other when interlocked.

Thus, the interlocking arrangement can be used to secure together two parts of a grinding device, for example a pepper mill, while allowing relative rotation thereof to effect its operation.

Advantageously, the device is of generally cylindrical or of generally polygonal configuration, for example being triangular, or rectangular.

BRIEF DESCRIPTION OF THE DRAWINGS

A releasable interlocking arrangement, and a device for grinding granular material incorporating said arrangement, will now be described, by way of example, with reference to the accompanying drawings, in which:

FIG. 6 is an elevation of a pepper mill with the second portion of the interlocking arrangement secured therewithin;

FIG. 7 is a plan view in the direction of the arrows D—D of FIG. 6;

FIG. 8 is an elevation of the lower part of a pepper mill that interlocks with the upper part of FIG. 6; and FIG. 9 is a plan view in the direction of the arrows E—E of FIG. 8.

DETAILED DESCRIPTION OF THE PREFERRED EMBODIMENTS

Figure 1:
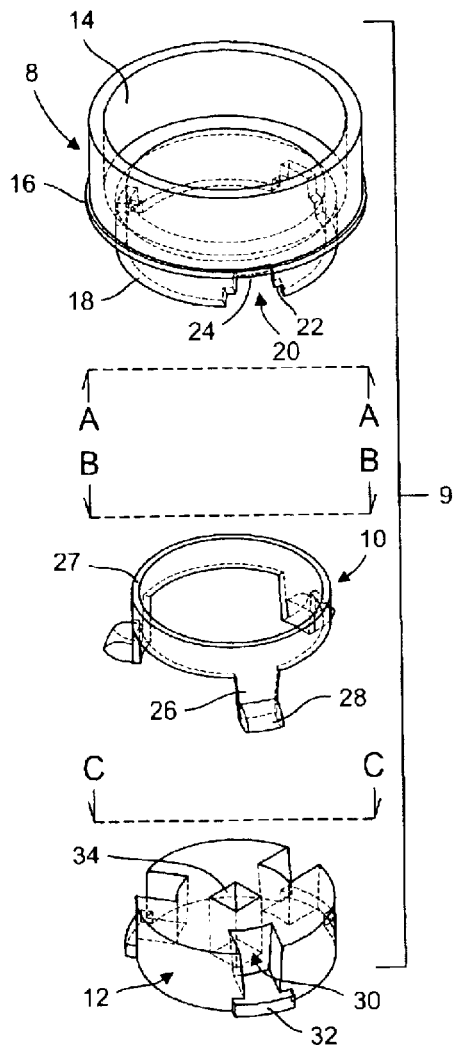
FIG. 1 is an exploded cross-sectional elevation of the interlocking arrangement.
Figure 2:
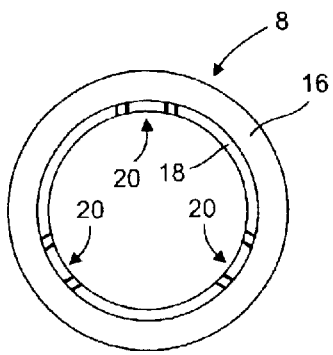
FIG. 2 is a plan view of one element of a second portion of the arrangement of FIG. 1 in the direction of the arrows A—A.
Figure 3:
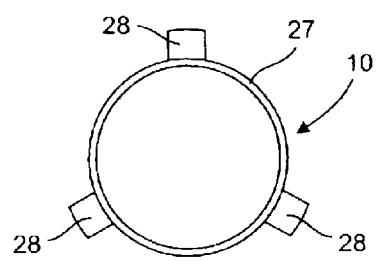
FIG. 3 is a plan view of another element of the second portion of the arrangement of FIG. 1 in the direction of the arrows B—B.
Figure 4:
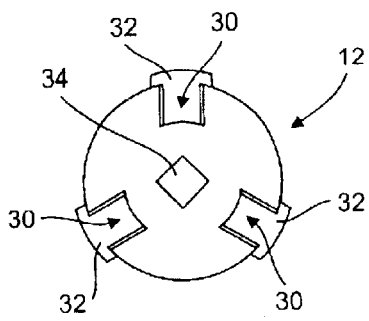
FIG. 4 is a plan view of a third element of the second portion of the arrangement of FIG. 1 in the direction of the arrows C—C.
Figure 5:
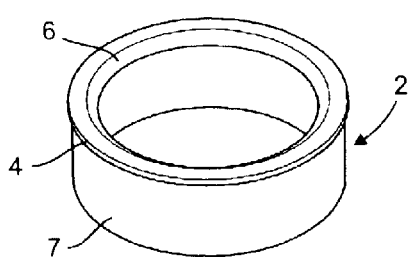
FIG. 5 is a side elevation of the assembled arrangement of FIG. 1, showing the first portion thereof in broken outline.
Figure 5:
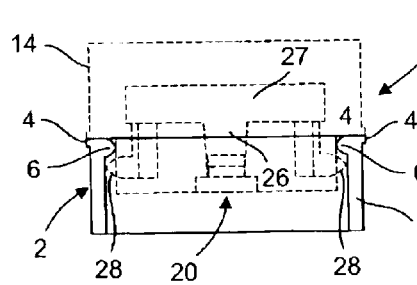

Referring to FIGS. 1 to 5, the releasable interlocking arrangement comprises a first portion 2 in the form of a cylindrical collar having at one end an outwardly-directed rim 4 and an inwardly-directed rim 6. A cylindrical skirt 7 extends away from the rimmed end of the collar 2. A second portion 9 of the arrangement consists of three elements, namely an upper cylindrical collar 8, an intermediate flexible ring-shaped element 10, and a lower disc-like plug 12.

The collar 8 has an upwardly-directed cylindrical skirt 14, an intermediate external flange 16 and a lower cylindrical skirt 18. The lower, free end of the skirt 18 has three castellated slots 20 cut into the circumference thereof equispaced from each other. Each slot 20 has a larger outer portion 22 and a closed narrower inner portion 24.

The flexible ring-shaped member 10 has three projections 26 extending downwardly from a ring 27 thereof and equi-spaced therearound, that terminate in outwardly-directed feet 28.

The disc-like plug member 12 has three equi-spaced slots 30 that extend longitudinally thereof and that are closed at their bottom ends by radially outwardly-extending tags 32. A square-section hole 34 extends longitudinally through the plug 12 centrally thereof.

The second portion 9 of the interlocking arrangement is assembled by positioning the ring-shaped member 10 on top of the plug 12, with its outwardly directed feet 28 sitting on respective ones of the tags 32, and with the projections 26 engaging respective slots 30, so that the elements 10 and 12 are rotationally locked together. This combination of elements is then inserted into the upper collar 8, whereby the feet 28 of the ring-shaped member 10 engage the respective portion 24 of the slots 20, and the tags 32 of the plug 12 engage respective outer portion 22 of the slot 20. At the same time, the outer periphery of the body of the plug 12 is a push fit into the lower skirt portion 18 of the collar 8, and is secured therewithin by a thin layer of adhesive along those two mating surfaces. As thus assembled, a single component is achieved that has the ring feet 28 projecting outwardly through the slots 20 beyond the skirt 18 of the collar 8. Since the ring-shaped member 10 is flexible, the feet 28 may be urged inwardly, with the projections 26 flexing to accommodate this movement. The arrangement of the unitary second portion 9 can now be releasably interlocked into the collar 2 of the first portion, by relative axial pressure therebetween that causes the feet 28 to flex inwardly as they engage the inner rim 6 of the collar 2 and then to relax outwardly and to engage the underside of the internal rim 6, thus holding the first and second portions 2 and 9 together. By holding the skirt 7 of the collar 2, the upper collar 8 may be rotated, with the feet 28 sliding around beneath the internal rim 6. The arrangement may be unlocked by axially pulling apart the collars 2 and 8, when the bevelled outer edges of the feet 28 allow them to flex inwardly and to be at released from the rim 6.

It will be appreciated that the effectively two-part interlocking arrangement described may be used to interconnect together two bodies to which they are respectively secured. One example of application of such an arrangement is in respect of a pepper mill, and this will now be described with reference to FIGS. 6 to 8.

The upper part of the pepper mill comprises a cylindrical cap 40 that is closed at its upper end, and that has the second portion 9 of the interlocking arrangement secured in its lower end, with the skirt 14 extending upwardly into the cap 40 until the outer flange 16 abuts the lower end thereof. A coating of adhesive around the outer cylindrical surface of the skirt 14 serves to provide permanent retention of the interlocking portion 9 in the cap 40.

The lower portion of the pepper mill is formed by a cylindrical container 50 having the same outer diameter as the cap 40, and contains a conventional peppercorn grinding mechanism 52 at the lower end thereof. A square-sectioned drive shaft 54 extends upwardly from the mechanism 52 and can be viewed from an observation window 56 at the lower end of the container 50. The shaft 54 projects beyond the upper end of the container 50. The first collar portion 2 of the interlocking arrangement is secured in the upper end of the container 50, by means of an adhesive coating on the outer surface of the cylindrical skirt 7 thereof.

In operation, peppercorns are loaded into the container 50, and the cap 40 and container 50 are brought together longitudinally, with the shaft 54 of the grinding mechanism 52 engaging with the correspondingly-shaped aperture 34 of the second interlocking portion 9, and are pressed together until the flexible feet 28 snap-fit behind the internal rim 6 of the collar 2, and with the flange 16 of the portion 9 abutting the outwardly-directed rim 4 of the portion 2. Thus, upon assembly the cap 40 is firmly secured longitudinally to the container 50, yet can be rotated relative thereto. The relative rotation of the cap 40 rotates the drive shaft 54, operating the grinding mechanism 52, thus grinding the corns and allowing pepper to flow out of the bottom of the pepper mill. To replenish the container 50, the cap 40 may be pulled upwardly therefrom thus causing the ring 10 to flex inwardly and to release the feet 28 from the collar 2, so as to separate the two parts of the pepper mill.

I claim:

1. A device for grinding granular material, comprising:

a housing having first and second ends, and a chamber opening to the first and second ends of the housing for storing granular material therebetween, a grinding mechanism closing the first end of the housing and a drive member extending toward the second end of the housing;

a cap to close the chamber at the second end of the housing; and a releasable interlocking arrangement that mates with the second end of the housing, comprising: a first cylindrical collar including a cylindrical skirt having an outwardly extending rim, and an inwardly extending rim, a second cylindrical collar having an upwardly extending cylindrical skirt, an intermediate external flange and a lower cylindrical skirt having three castellated slots spaced around the circumference thereof;

a flexible ring shaped member having three feet extending downwardly and outwardly therefrom to fit in the castellated slots in the lower cylindrical skirt; and a disc shaped plug member having three longitudinally extending slots spaced equally around the circumference thereof, each slot having a flange extending therefrom, the disc shaped plug member having an opening extending longitudinally through a central portion of the plug, the longitudinally extending slots receiving the feet of the flexible ring shaped member.

2. A device in accordance with claim 1, wherein the opening in the disc shaped plug member is square in section.

3. A device in accordance with claim 1, wherein the granular material comprises peppercorns.

4. A device in accordance with claim 2, wherein the ring shaped member is positioned on top of the plug shaped member with each of the feet sitting on a flange and with the projections engaging a respective slot so that the ring and plug shaped members are rotationally interlocked.

5. A device in accordance with claim 4, wherein the drive member of the grinding mechanism engages the rotationally interlocked ring and plug shaped members with the housing rotatable with respect to the interlocked ring and plug shaped members.

6. A device in accordance with claim 4, wherein the housing and the interlocking ring and plug are substantially cylindrically shaped.

7. A device in accordance with claim 5, wherein the housing and the interlocking ring and plug are substantially polygonally shaped.

* * * * *